C. W. TAYLOR.
BRAKE DEVICE FOR DIFFERENTIALS.
APPLICATION FILED JAN. 13, 1919.
1,324,859.
Patented Dec. 16, 1919.
2 SHEETS—SHEET 1.
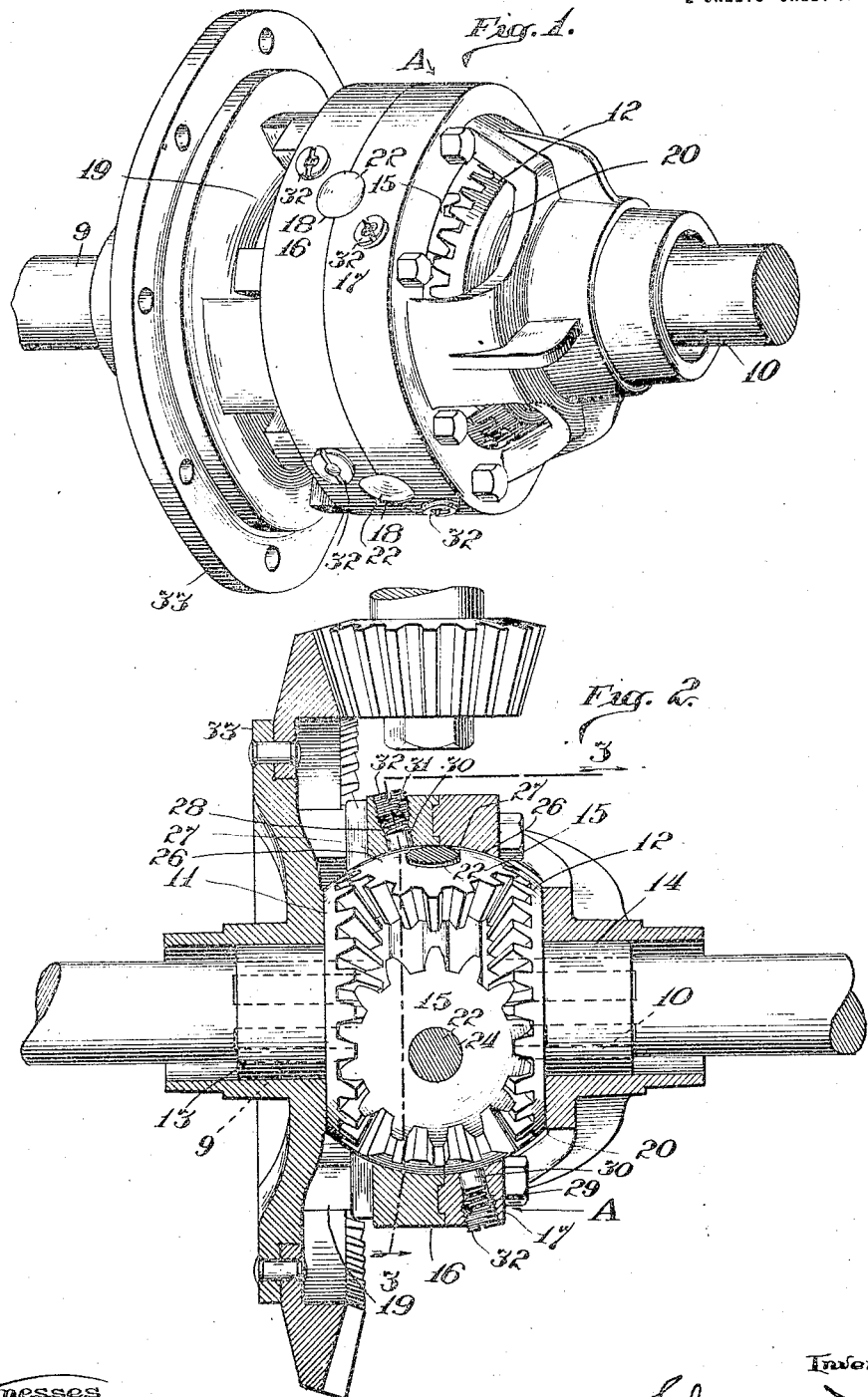

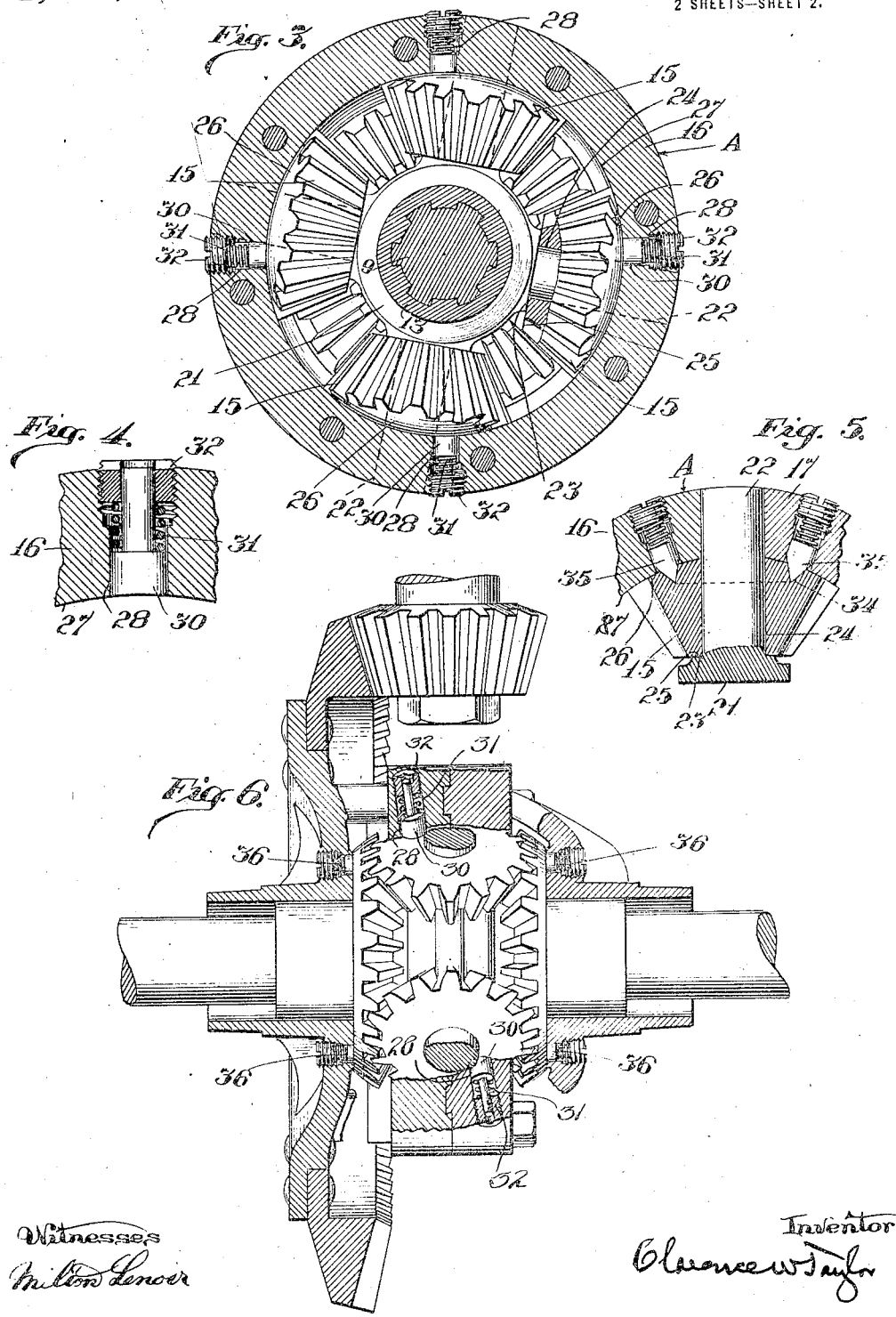

UNITED STATES PATENT OFFICE.

CLARENCE W. TAYLOR, OF CHICAGO, ILLINOIS, ASSIGNOR TO ONLAKE COMPANY, OF CHICAGO, ILLINOIS, A CORPORATION OF ILLINOIS.

BRAKE DEVICE FOR DIFFERENTIALS.

1,324,859. Specification of Letters Patent. Patented Dec. 16, 1919.

Application filed January 13, 1919. Serial No. 270,825.

*To all whom it may concern:*

Be it known that I, CLARENCE W. TAYLOR, a citizen of the United States of America, residing at Chicago, in the county of Cook and State of Illinois, have invented certain new and useful Improvements in Brake Devices for Differentials, of which the following is a specification.

My invention relates to improvements in brake devices for differentials, in which friction members are mounted in and accessible from the outside of the rotatable carrier and act against rotatable members within the carrier thus setting up braking action to oppose rotative movement of said rotatable members relative to said carrier; and the objects of my improvement are, First, to provide a construction whereby to prevent what is termed "spinning" of one vehicle drive wheel independently of the other vehicle drive wheel on slippery or soft road surfaces, Second, the production of devices in differentials which in operation will ordinarily act substantially similarly to a solid rear axle and yet give sufficient differentiation in turning a corner; and Third, the provision of simple and efficient mechanism readily adaptable to differentials extant without expensive changes in design, and for the purpose of providing what may be termed velocity-equalizers for drive wheels.

A practical embodiment of the invention is illustrated in the accompanying drawings which are a part hereof and in which similar characters of reference indicate the corresponding parts in all the views.

The invention consists in the novel features and parts and in the novel combination and arrangement of said parts, which will be more fully described hereinafter and then pointed out in the claims.

Figure 1 is a perspective of the exterior of the rotatable carrier or housing, the power transmission gear train therein and portions of the adjacent ends of the divided shaft with my invention incorporated therewith.

Fig. 2 is a longitudinal central section of the rotatable carrier.

Fig. 3 is a cross sectional view on line 3—3 on Fig. 2 looking in the direction of the arrow.

Fig. 4 is a sectional detail of a single friction member mounted in a portion of the rotatable carrier for frictional resistance to rotative movement of a member of the power transmission gear train.

Fig. 5 is a sectional detail of a modified member of a circular series of pinions formed with an annular groove in its outer end and its mounting with friction members oppositely positioned, with tapered ends disposed in said groove.

Fig. 6 is a longitudinal section with parts in elevation showing the friction members positioned to exert frictional resistance against the draft gears of the power transmission gear train.

In the embodiment chosen to exemplify my invention friction members are constructed and mounted in a rotatable carrier or housing so that one end of each said friction member is accessible outside said rotatable carrier for adjustment or otherwise and the other end is positioned to exert frictional resistance against parts within the carrier and rotatable relatively to said carrier.

The usual rear axle shaft comprises two halves 9, 10, and the power transmission gear train comprises a pair of draft gears 11, 12, having inwardly extending hubs 13, 14, fixed to the adjacent ends of the divided shaft, and a circular series of pinions 15 interposed between and in mesh with both of said draft gears about the axis of the connected shafts 9, 10.

The rotatable carrier or housing A comprises left and right portions 16, 17, each having trunnion recesses 18, at intervals in their meeting edges and openings 19, 20 for the passage of lubricant through and into, the carrier and to said gear train.

The spider or driver 21, is formed with radial trunnions 22, having outer free ends disposed in the recesses 18, in the meeting edges of the rotatable carrier A. The inner ends of said trunnions preferably are integral with the body or ring portion of the spider 21, which is of greater cross section at 23, forming abutments, through the axial opening 24, in the pinion 15, and by reason thereof inward radial movement of said pinion is limited. The pinions 15 are loosely mounted and rotatable on the trunnions 22.

The inner face 25 of each pinion 15 has bearing against the contiguous surface or abutment 23 of the spider 21.

The outer end surface 26 of each pinion 15 has rotative movement relative to the adjacent inner wall 27, of the rotatable carrier A. Near the meeting edges of the two portions 16 and 17 of the carrier A are provided radial openings 28 and 29, preferably not in alinement, which are accessible from the outside of the rotatable carrier A, each of said openings having a friction stud member 30 capable of inward movement. A pressure tension element 31 comprising a compression coil reacts between the friction stud member 30 and the hollow closure cap 32, which is in threaded engagement with the rotatable carrier A. One of said friction stud members may be used for each pinion 15 for light work, but preferably in a two or more pinion differential a pair of friction stud members are positioned oppositely in the carrier to exert frictional resistance against each pinion inside the carrier A to oppose rotative movement of the pinions relative to the carrier. The openings 28, 29, may be round or angular as preferred. If angular then the friction stud member should correspond to prevent rotation on its own axis in its carrier opening.

The left part 16 of the rotatable carrier A is provided with an external annular flange 33 to which the usual ring gear is fixed in the usual manner for power transmitting connection with the engine shaft (not shown).

In Fig. 5 is disclosed an annular groove 34 in the outer face of each pinion 15 and one end of the friction stud member 30 is shaped to correspond with the groove when employed to effect a greater degree of frictional resistance to rotations of the pinion or pinions.

In Fig. 6 a slightly modified construction is shown in which the spring pressed friction members 35 are disposed for frictional contact with the respective draft gears 11, 12. This construction may be used in addition to the friction members shown in Figs. 1 to 4 inclusive or either of said forms may be employed independently as preferred, or required for the service to be performed. The dimensions of the friction members 30, and 35 and the tension elements of each will vary necessarily with the degree of braking effort required and the number of friction members used.

In construction and operation, the number and dimensions of the friction members, including the resilient elements, will naturally depend upon the extent of braking action required in the particular instance, whether light car or heavy duty truck or otherwise.

It should be remembered that enough frictional resistance to rotative movement of members of the power transmission gear train relative to the rotatable carrier may be provided so as to be greater than the forces acting at the peripheries of the road wheels to practically prevent sufficient differentiation when operating in a curved path which is not desirable.

In a Ford rear axle a satisfactory test has demonstrated that one horse power was required to overcome the brake effort at thirty three miles per hour.

By thus showing and specifically describing the embodiment herein of my invention, I do not intend to restrict the range of equivalents more than is made necessary by the prior state of this art.

Having thus fully described my invention, what I claim as new, and desire to secure by Letters-Patent is,

1. In a differential transmission device, the combination with a rotatable carrier and a power transmission gear train operatively positioned and supported within said carrier, of a friction member mounted in and accessible from the outside of said carrier for frictional resistance applied within said carrier against a portion of said power transmission gear train for braking action to oppose rotative movement of members of said gear train.

2. In a differential transmission device, the combination with a rotatable carrier and a power transmission gear train operatively positioned and supported within said carrier, of a friction member mounted in and accessible from the outside of said carrier for frictional action against a member of said gear train and a friction member mounted in and accessible from the outside of said carrier, for frictional action against another member of said gear train for braking action to oppose rotative movement of members of said gear train relative to said carrier.

3. In a differential transmission device, the combination with a rotatable carrier, a power transmission gear train, a divided shaft fixed to members of said gear train and a spider having abutments to limit inward radial movement of members of said gear train, of a plurality of friction members mounted in and accessible from the outside of said carrier to exert frictional resistance within said carrier against members of said power transmission gear train for braking action to oppose rotative movement of members of said gear train with which the friction members are in frictional encounter.

4. In a differential transmission device, the combination with a rotatable carrier, a spider, a power transmission gear train, a divided shaft fixed to members of said gear train, of a plurality of friction members each comprising a friction stud, a resilient element and a closure cap mounted in and accessible from the outside of said carrier to permit adjustment of the degree of frictional resistance exerted within said carrier against a portion of said power transmission gear train for braking action to oppose rotative movement of said portion of said gear train relative to said carrier.

5. In a differential transmission device, the combination with a rotatable carrier and a power transmission gear train operatively positioned and supported within said carrier, of a spring actuated friction member mounted in and accessible from the outside of said carrier for adjustment of the degree of frictional resistance applied within said carrier against a portion of said power transmission gear train for braking action to oppose rotative movement of members of said gear train.

6. In a differential transmission device, the combination with a rotatable carrier and a power transmission gear train operatively positioned and supported within said carrier, of a plurality of spring actuated friction members mounted in and accessible from the outside of said carrier for adjustment of the degree of frictional resistance applied within said carrier against portions of said power transmission gear train for braking action to oppose rotative movement of members of said gear train.

In testimony whereof I affix my signature.

CLARENCE W. TAYLOR.